(12) United States Patent
Owens et al.

(10) Patent No.: US 12,392,435 B1
(45) Date of Patent: *Aug. 19, 2025

(54) TOOLLESS DISASSEMBLY ROTATIONAL VACUUM COUPLING

(71) Applicants: Clay Owens, Springdale, AR (US); Alan Davison, Springdale, AR (US); Chris Clouse, Fayetteville, AR (US)

(72) Inventors: Clay Owens, Springdale, AR (US); Alan Davison, Springdale, AR (US); Chris Clouse, Fayetteville, AR (US)

( * ) Notice: Subject to any disclaimer, the term of this patent is extended or adjusted under 35 U.S.C. 154(b) by 55 days.

This patent is subject to a terminal disclaimer.

(21) Appl. No.: 17/986,093

(22) Filed: Nov. 14, 2022

Related U.S. Application Data

(63) Continuation-in-part of application No. 16/810,397, filed on Mar. 5, 2020, now Pat. No. 11,525,535.

(51) Int. Cl.
  *F16L 37/091* (2006.01)
  *F16L 37/10* (2006.01)

(52) U.S. Cl.
  CPC ......... *F16L 37/0915* (2016.05); *F16L 37/105* (2013.01); *F16L 37/101* (2013.01)

(58) Field of Classification Search
  CPC ....... F16L 37/101; F16L 37/105; F16L 37/14; F16L 37/0885; F16L 35/00; F16L 27/0804

USPC .......................................................... 285/38
See application file for complete search history.

(56) References Cited

U.S. PATENT DOCUMENTS

| | | | |
|---|---|---|---|
| 2,025,848 A | 12/1935 | Collis | |
| 5,295,507 A | 3/1994 | Brandy et al. | 137/614.06 |
| 5,452,924 A | 9/1995 | Kujawski | 285/305 |
| 5,593,187 A | 1/1997 | Okuda et al. | 285/305 |
| 6,065,779 A | 5/2000 | Moner et al. | 285/23 |
| 6,113,306 A | 9/2000 | Allert | 403/344 |
| 8,857,863 B1 | 10/2014 | Patin et al. | 285/386 |
| 9,533,405 B2 | 1/2017 | Chern | B25B 27/205 |
| 11,479,809 B2 | 10/2022 | Frisen et al. | C12Q 1/6837 |
| 11,500,573 B2 | 11/2022 | Graham et al. | G06F 3/0652 |
| 11,571,218 B2 | 2/2023 | Allen et al. | A61B 17/1215 |

*Primary Examiner* — Zachary T Dragicevich
(74) *Attorney, Agent, or Firm* — Keisling & Pieper PLC; David B. Pieper; Trent C. Keisling

(57) ABSTRACT

A hand disassembly rotational valve coupling for tool less manipulation by a user's hands and fingers using a coupling housing body defining an output seal aperture close to an output handle retention slot and slot lip, where the slot lip has a slot handle gap and an output seal retainer including a coupling handle ring with a first triangulated offset body retention ears and hand graspable handles separated by a ring handle gap for hand assembly and disassembly from the coupling housing body.

2 Claims, 11 Drawing Sheets

TOOLLESS DISASSEMBLY ROTATIONAL VACUUM COUPLING

CROSS-REFERENCE TO RELATED APPLICATIONS

This application claims priority to and is a continuation-in-part of U.S. patent application Ser. No. 16/810,397, filed on Mar. 5, 2020 entitled TOOLLESS DISASSEMBLY ROTATIONAL VACUUM COUPLING, now U.S. Pat. No. 11,525,535 which is hereby incorporated by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in rotational vacuum couplings. More particularly, the invention relates to improvements particularly suited for providing hand disassembled vacuum tube couplings for meat processing facilities that must be regularly disassembled and cleaned. In particular, the present invention relates to a toolless disassembly rotational valve coupling with a hand operable securing ring.

2. Description of the Known Art

As will be appreciated by those skilled in the art, couplings are known in various forms. Patents disclosing information relevant to various aspects of the prior art include: U.S. Pat. No. 2,025,848, issued to Collis on Dec. 31, 1935 entitled Locking device for pins, bolts, or the like; U.S. Pat. No. 6,113,306, issued to Allert on Sep. 5, 2000 entitled Securing ring ("c" clip); and U.S. Pat. No. 9,533,405, issued to Chern on Jan. 3, 2017 entitled C-clip tool. Each of these patents is hereby expressly incorporated by reference in their entirety.

In meat processing facilities one of the biggest problems is cleanliness and maintaining a clean environment to avoid bacteria growth, the introduction of foreign objects, or other contaminants that would cause health issues. Every piece of machinery has to be able to be disassembled and cleaned, and must be manufactured out of food grade material. It is also necessary to completely disassemble processing equipment for cleaning on a regular basis such as once per day or at the end of each shift. Most current equipment is complicated to disassemble, clean, and reassemble.

From these prior references and problems it may be seen that these prior art patents are very limited in their teaching and utilization, and an improved toolless disassembly rotational valve coupling is needed to overcome these limitations.

SUMMARY OF THE INVENTION

The present invention is directed to an improved toolless disassembly rotational valve coupling. The toolless disassembly rotational valve coupling uses a weld mount tube threaded into a flexing arm extension of a non-rotating coupling housing body such that it is flowably connected to the first end of the coupling housing body. The opposing end of the coupling housing body is then flowably and sealably connected to a rotating output tube using an output seal that is secured by an output seal retainer. The seal and output seal retainer can be released without tools through the use of a coupling handle ring. This allows a hand assembly and disassembly of the coupling without requiring tools. This also provides an assembled unit of food grade material that is easily sterilized to provide easy cleaning of the disassembled parts. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
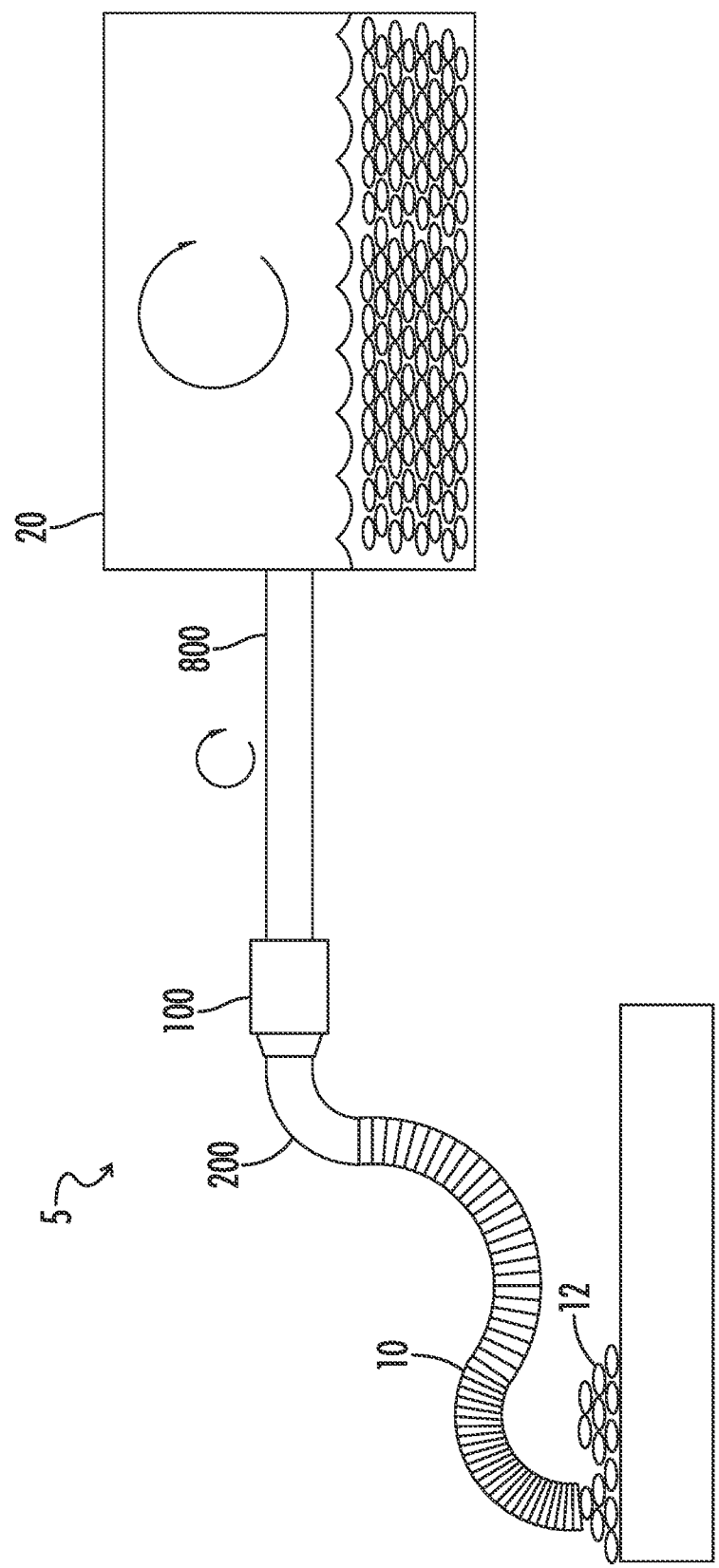
FIG. 1 is a schematic view of a meat processing tank with a vacuum input hose connected by a toolless disassembly rotational valve coupling to a rotating drum.
Figure 6:
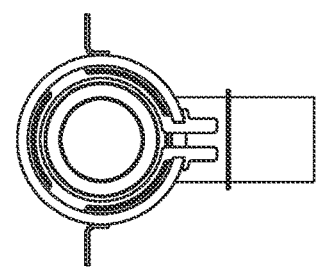
FIG. 6 is a back view thereof.
Figure 3:
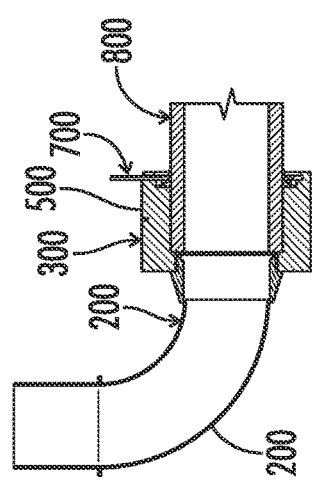
FIG. 3 is a cutaway view along line A-A of FIG. 2.
Figure 2:
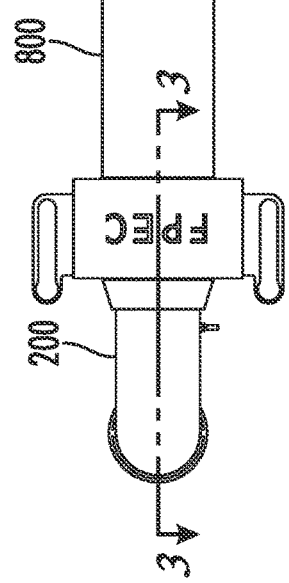
FIG. 2 is a top view of the toolless disassembly rotational valve coupling positioned between a weld mount tube and a rotating output tube.
Figure 4:
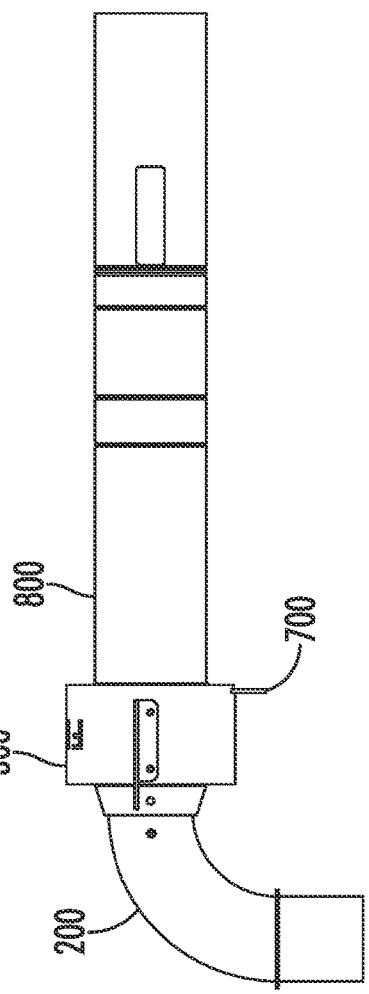
FIG. 4 is a side view of the toolless disassembly rotational valve coupling positioned between the weld mount tube and the rotating output tube.
Figure 5:
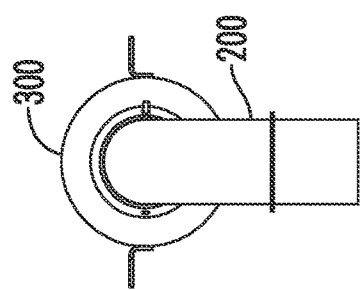
FIG. 5 is a front view thereof.
Figure 7:
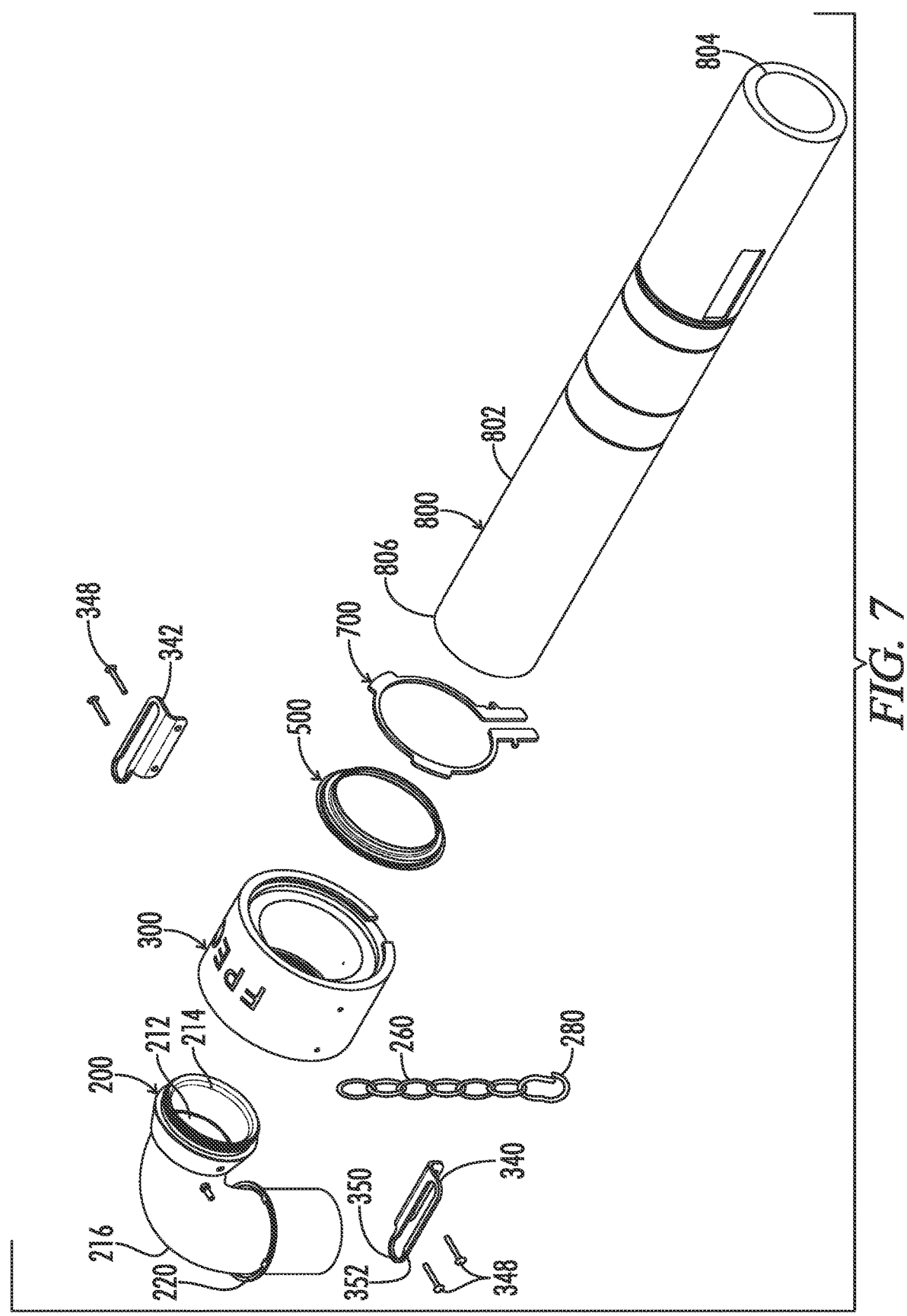
FIG. 7 is an exploded view thereof.
Figure 9:
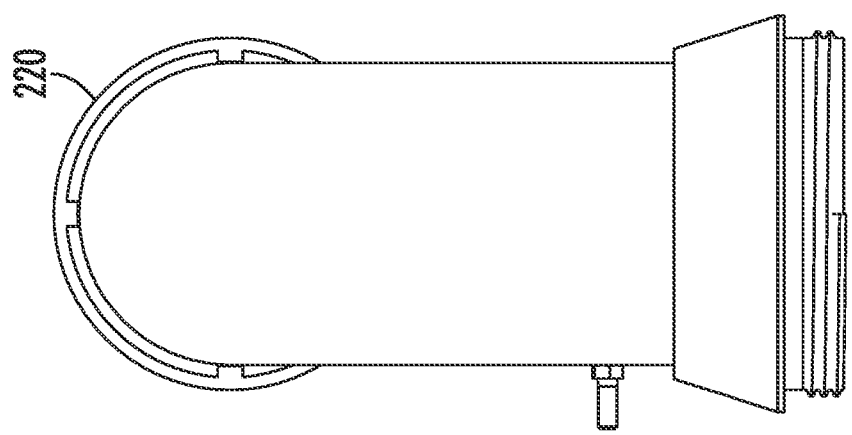
FIG. 9 is a front view of the weld mount tube.
Figure 8:
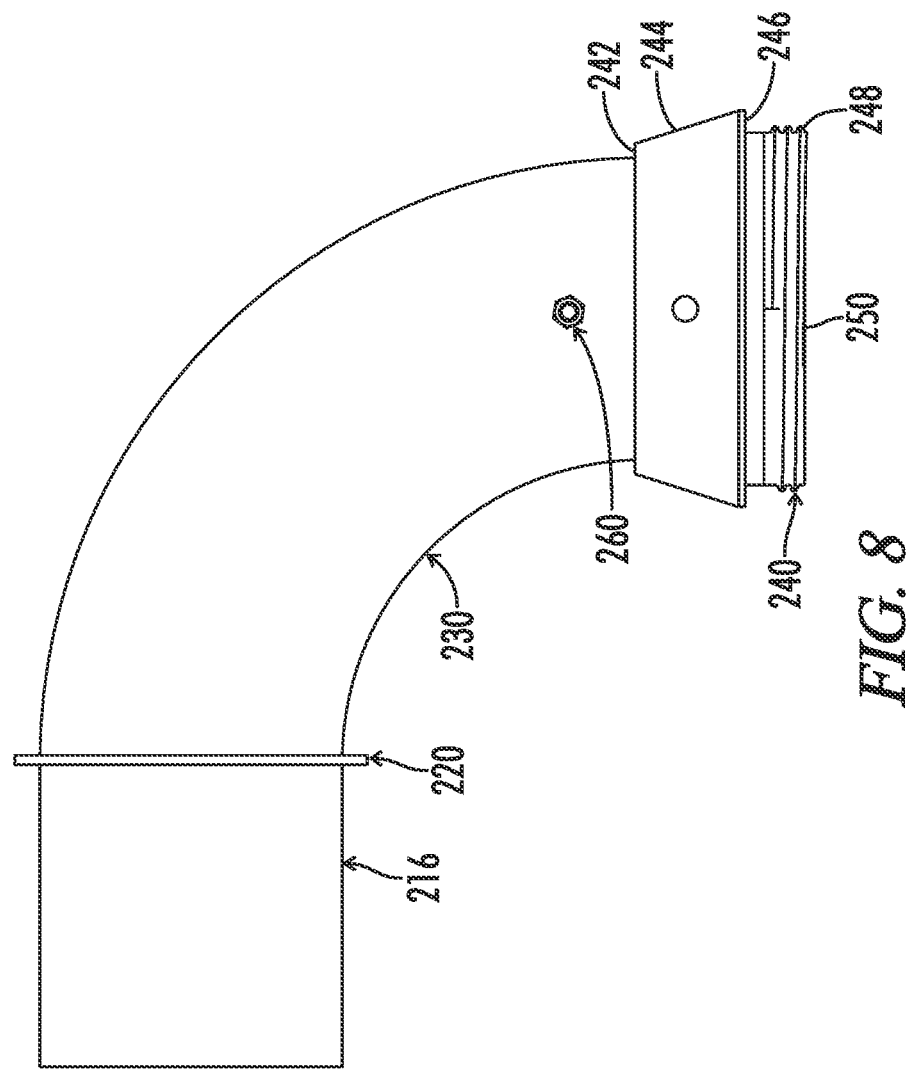
FIG. 8 is a side view of the weld mount tube.
Figure 10:
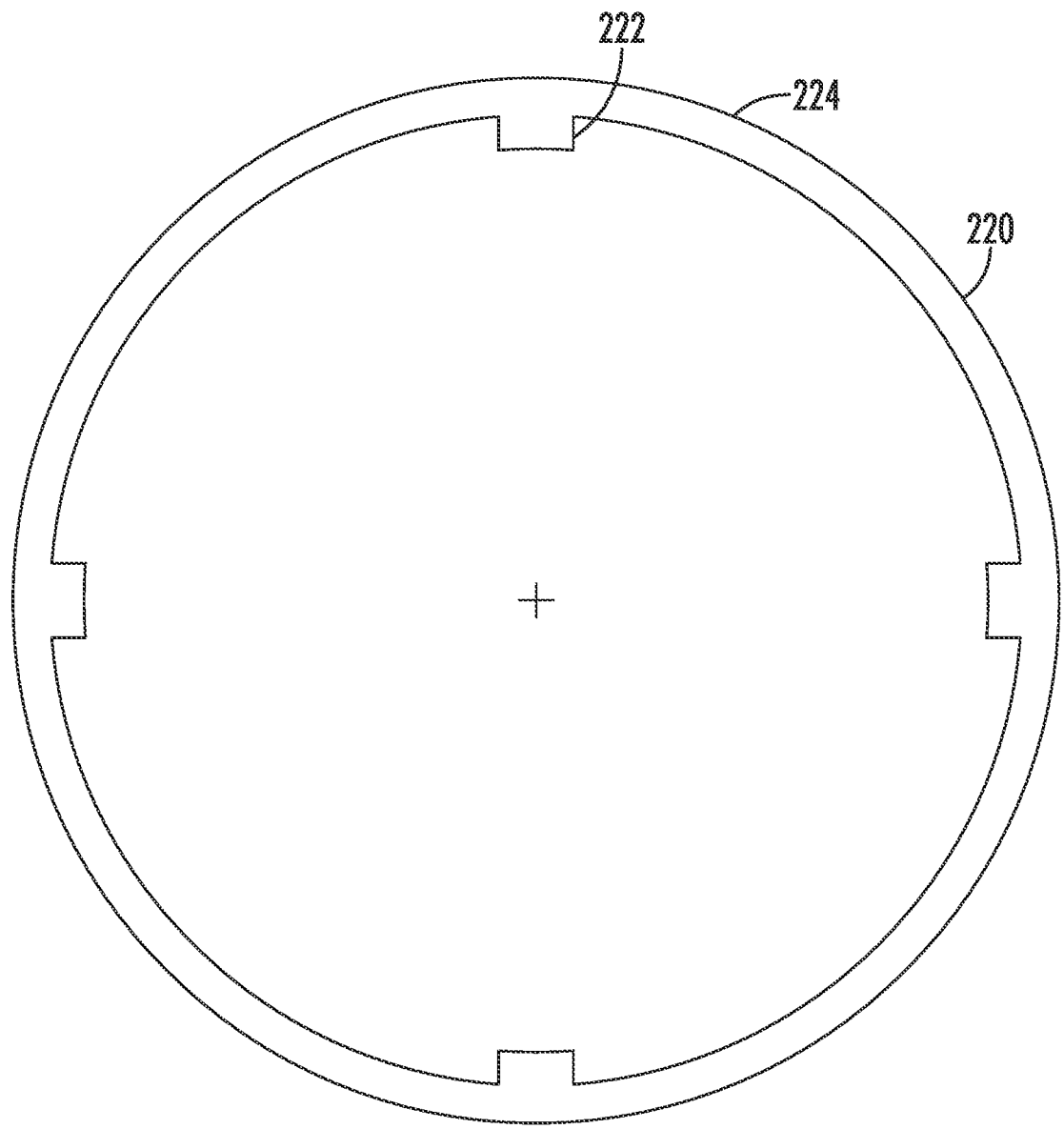
FIG. 10 is a top view of the weld mount input flange.
Figure 13:
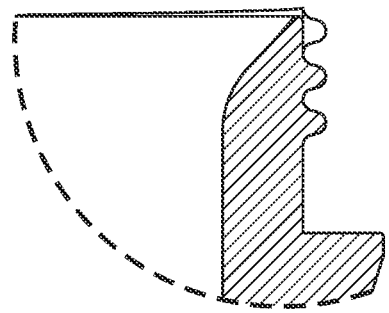
FIG. 13 is a magnified view of the area B of FIG. 12.
Figure 12:
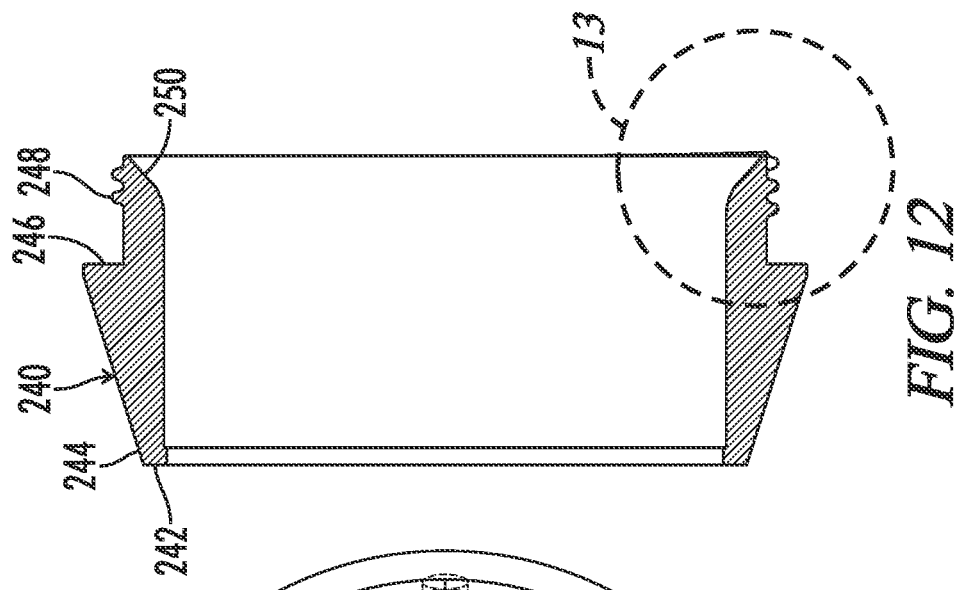
FIG. 12 is a cutaway view along line A-A of FIG. 11.
Figure 11:
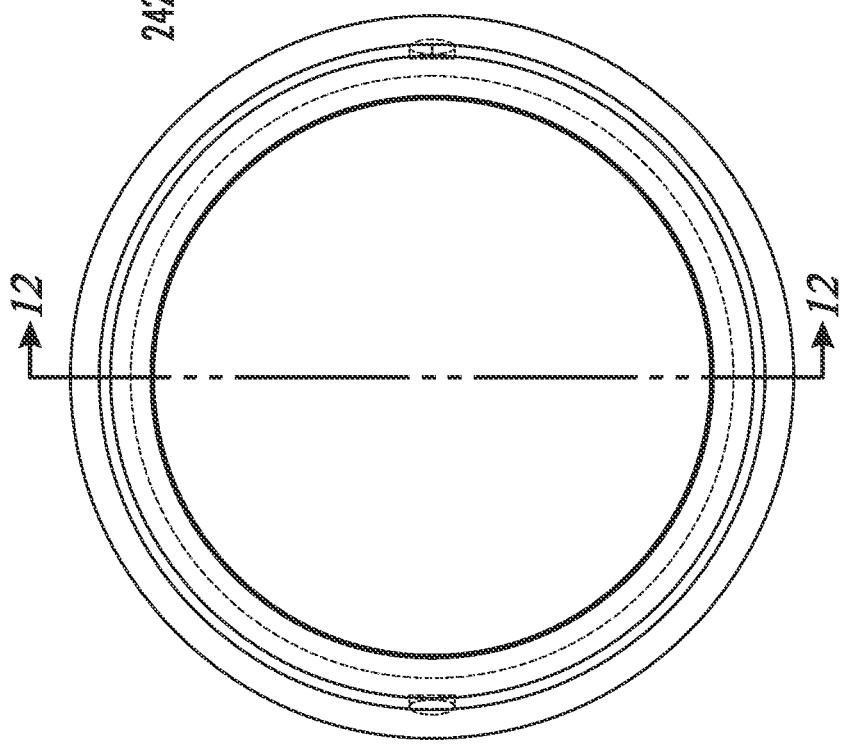
FIG. 11 is a front view of the weld mount output flange.
Figure 15:
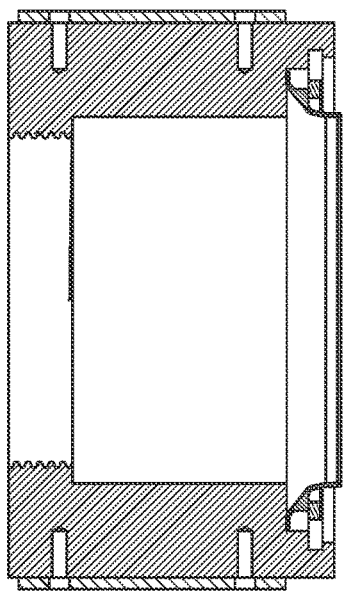
FIG. 15 is a cutaway view along line A-A of FIG. 14.
Figure 14:
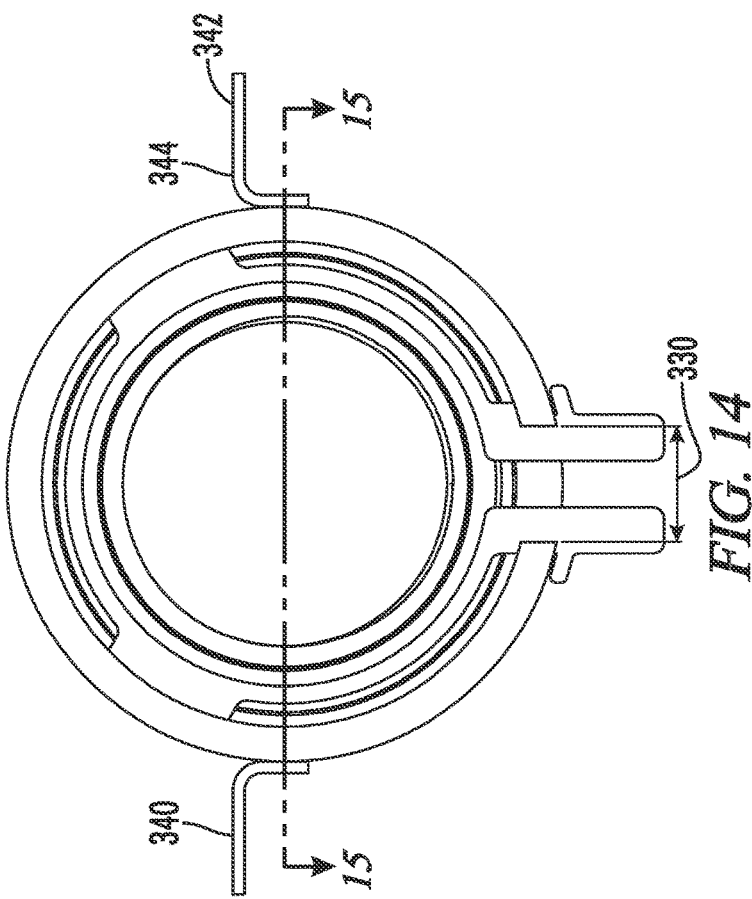
FIG. 14 is a back view of the toolless disassembly rotational valve coupling.
Figure 16:
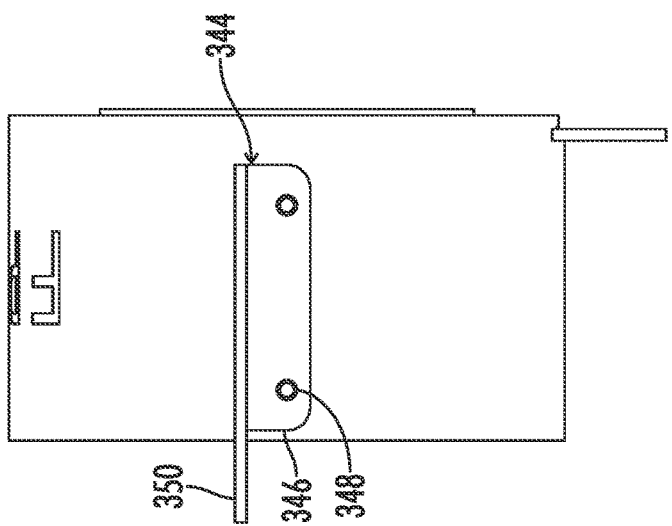
FIG. 16 is a right side view of the toolless disassembly rotational valve coupling.
Figure 18:
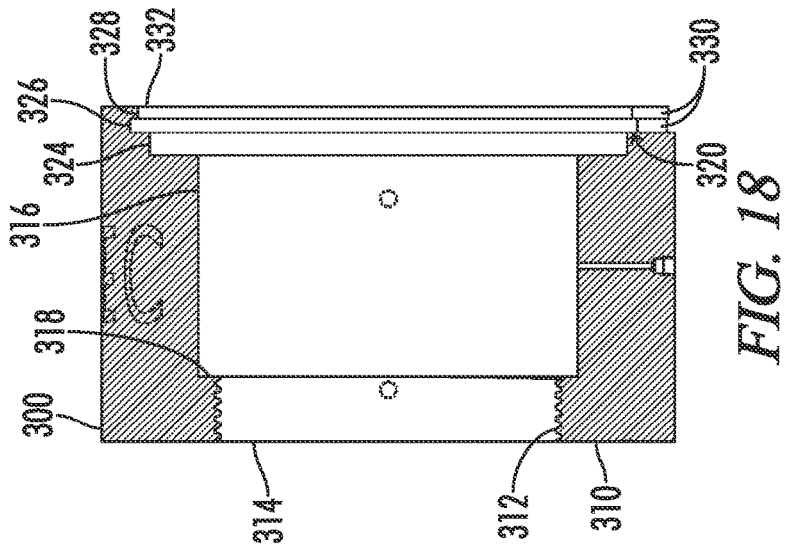
FIG. 18 is a cutaway view along line A-A of FIG. 17.
Figure 19:
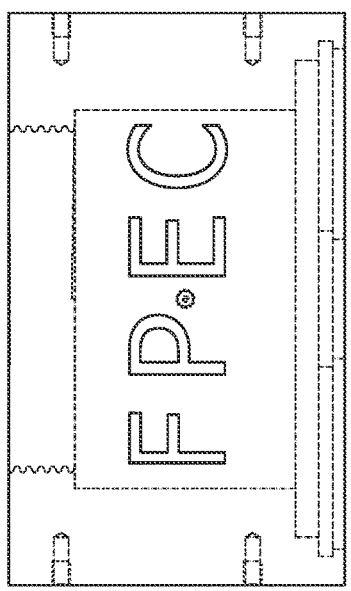
FIG. 19 is a top view of the coupling housing body.
Figure 17:
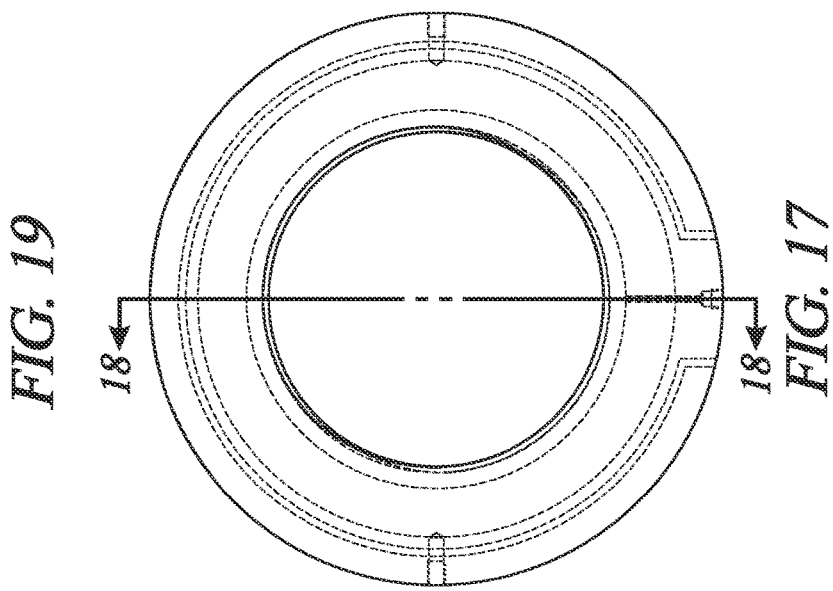
FIG. 17 is a back view of the coupling housing body
Figure 20:
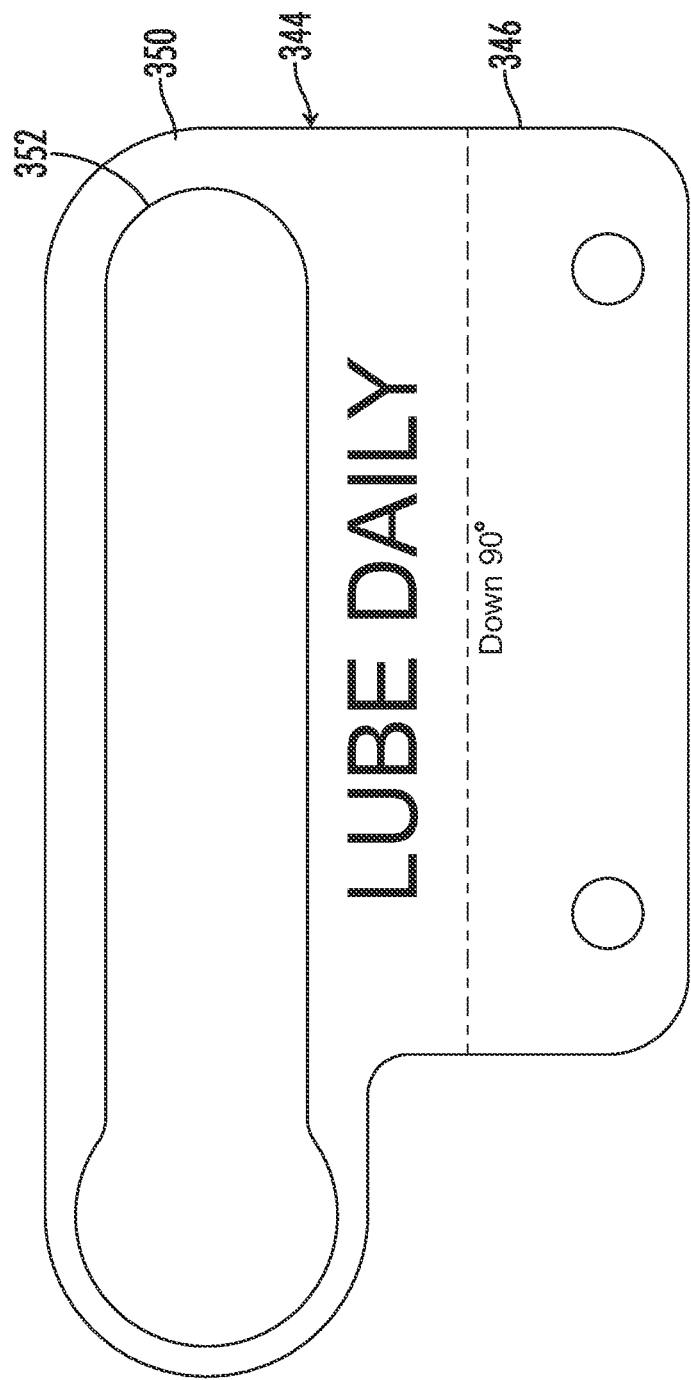
FIG. 20 is a top view of the angle handle body.
Figure 22:
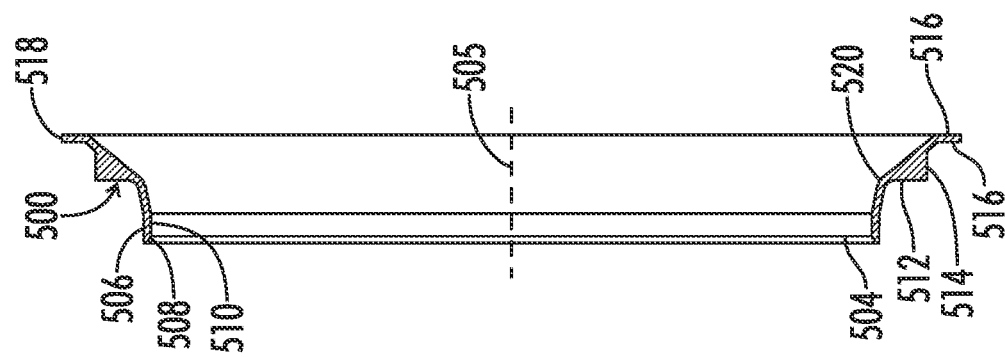
FIG. 22 is a cutaway view along line A-A of FIG. 21.
Figure 21:
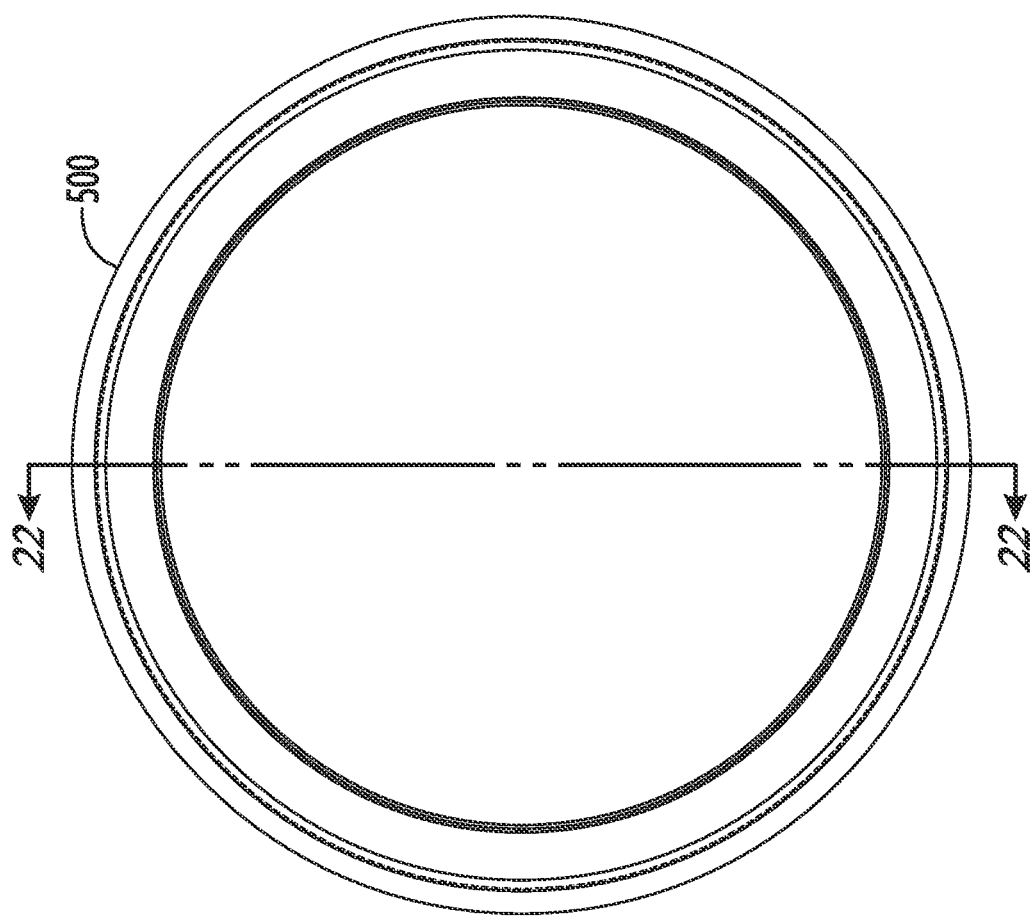
FIG. 21 is a back view of the rotational output tube seal.
Figure 23:
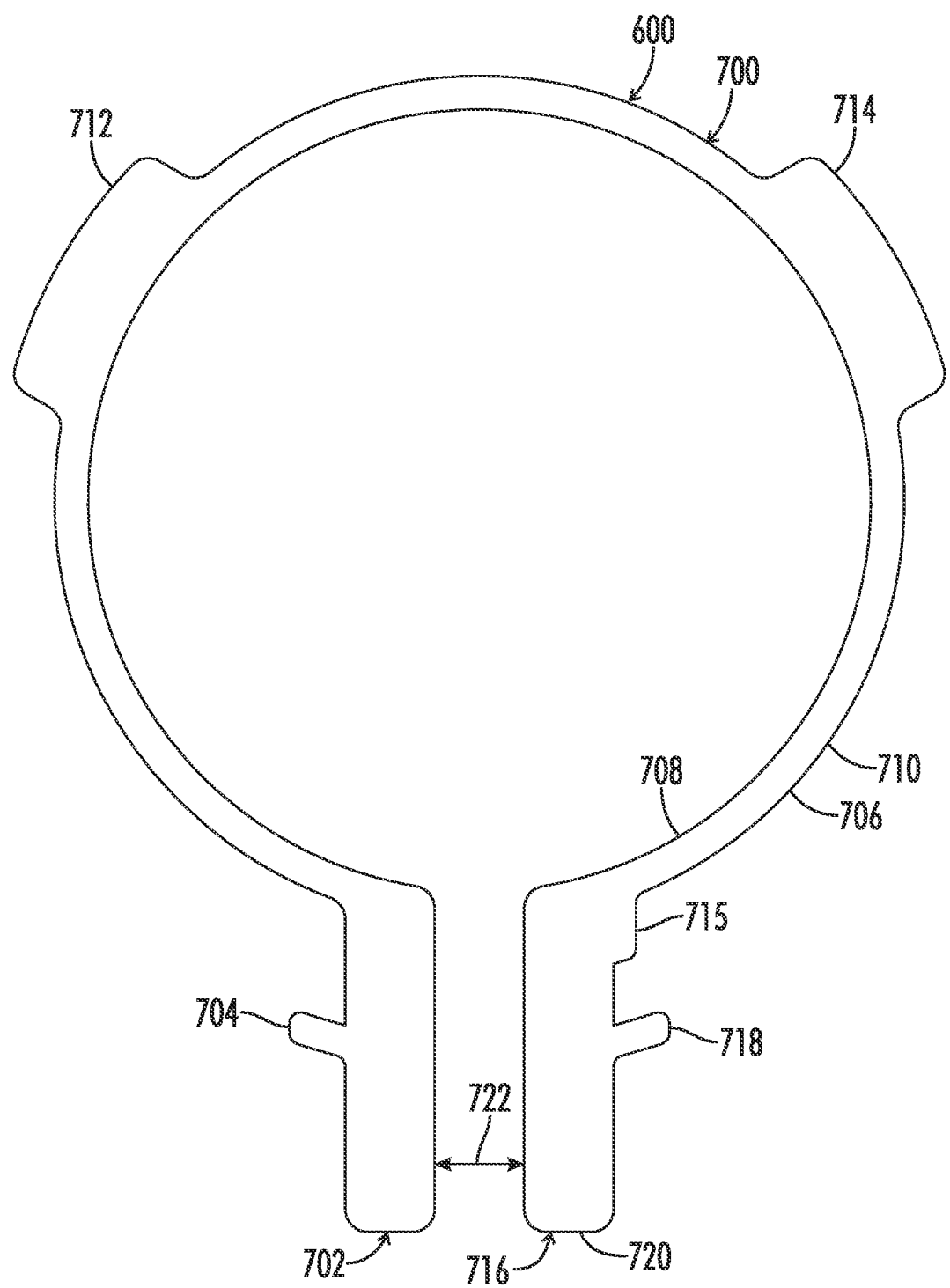
FIG. 23 is a back view of the output seal retainer.

As shown in FIG. 1 through 23 of the drawings, one exemplary embodiment of the present invention is generally shown in a meat 12 processing line 5 using a toolless disassembly rotational valve coupling 100 positioned between 1) a flexible vacuum pickup tube 10 coupled to the weld mount tube 200 and 2) the rotating output tube 800 rotating with a rotational meat treatment drum 20. A vacuum is pulled on the interior of the drum 20 where meat 12 is tumble rotated for treatment with items such as marinades. The meat 12 is loaded into the drum via the vacuum suction. The vacuum suction start in the drum 20 and acts through the rotating output tube 800, the toolless disassembly rotational valve coupling 100, the weld mount tube 200, and through the flexible vacuum pickup tube 10 where the suction picks up the meat 12 and transfers it back to the drum 20. In this configuration, the toolless disassembly rotational valve coupling 100 provides a coupling between a fixed position input elbow weld mount tube 200 and a rotating output tube 800.

The toolless disassembly rotational valve coupling 100 is constructed with a weld mount tube 200 threaded into a non-rotating coupling housing body 300 with the output end using a rotational output tube seal 500 held in place by a coupling handle ring 700 positioned around an output tube 800. Each of these items will be described in further detail infra.

The weld mount tube 200 uses an input tube body 210 defining a body through aperture 212 with an input body interior surface 214 and input body exterior surface 216. An input flange 220 is mounted on the input body exterior surface 216 using tab feet 222 inwardly projecting off of a body ring 224. The elbow curve body section 230 ends in a welded on output flange 240 including a weld edge 242 leading to a rising weld body 244 which steps back at an input force transfer shoulder 246 to the input coupling threads 248 at a flange output end 250. The input coupling threads are seven and one quarter inch (7.25 in) knuckle threads so that the threads can be unscrewed using hand force without requiring tools. A safety chain coupling 260 mounts a safety chain 270 with a chain latch 280 that is selectively latched or connected to the handle 340 to ensure the parts do not unscrew during operation but can be disassembled for cleaning.

The coupling housing body 300 includes a housing input end 310 with input body threads 312 spaced by an input thread friction aperture 314 to allow for the threads to have some independent movement from the remainder of the coupling housing body 300. The coupling housing body 300 further defines a central aperture 316, an output force transfer shoulder 318, an output tube 320, an output seal aperture 324, an output handle retention slot 326, slot lip 328, and a slot handle gap 330 proximate to the housing output end 332. The coupling housing body 300 can be selectively secured and handled by users through the use of a first housing handle mount 340 and a second housing handle mount 342 secured to the outside of the coupling housing body 300 with mounting fasteners 348. Each handle mount 340, 342 includes an angle handle body 344 with a mounting flange 346 with fastener apertures for the mounting fasteners 348 and a handle flange 350 defining a handle aperture 352 for attachment of a connector, snap, hook, carabiner, chain link, rope knot or other method of attachment.

The rotational output tube seal 500 is positioned in the output seal aperture 324 and secured in place by an output seal retainer 600 which is shown as a coupling handle ring 700 but could be as simple as a snap ring. The rotational output tube seal 500 is a flexible material forming a seal body 502 that defines a central seal aperture 504 having a central axis 505 through the seal. The seal body 502 includes a pipe end 506 with an internal pipe output chamfer 508 and a tube lip 510. Rising from the tube lip 510 is a retainer face 512 perpendicular to the central axis 505 which then leads to a body face 514 parallel to the central axis 505. The seal body 502 then defines a body lip 516 at the input end 518 and an internal pipe input chamfer 520 for the central seal aperture 504.

One significant advantage of the present invention is provided by the flexible coupling handle ring 700 and user operable handles 702 716. The coupling handle ring 700 is made of spring metal, one quarter inch stainless steel plate is the preferred material, such that the handles 702, 716 can be compressed for removal and will expand back to their original position for installation as described herein. The coupling handle ring 700 defines a first triangulated offset hand graspable handle 702 that is graspable by a user's fingers with a first outer body tab 704, and a second triangulated offset hand graspable handle 716 with a second outer body tab 718 such that the tabs 704, 718 hold the triangulated offset hand graspable handles 702, 716 outside of the coupling housing body 300 so that the use can grasp them with their fingers to hand disassemble the toolless disassembly rotational valve coupling 100. Note that the triangulated offset hand graspable handles 702, 716 each have a rounded handle end 720 so the user is not injured by the handles 702, 716.

The coupling handle ring 700 also includes a c shaped handle body 706 with a body interior edge 708 contacting and securing the rotational output tube seal 500 and the body exterior edge 710 defining a first triangulated offset body retention ear 712, a second triangulated offset body retention ear 714, and a handle offset body retention ear 715 where the ears 712, 714, 715 fit into the output handle retention slot 326 behind the slot lip 328 to releasably secure the coupling handle ring 700 in the coupling housing body 300.

The triangulated offset hand graspable handles 702, 716 extend out of the slot handle gap 330 and are separated by a ring handle gap 722 such that the triangulated offset hand graspable handles 702, 716 can be selectively compressed toward each other to remove the handle offset body retention ear 715 from the output handle retention slot 326 behind the slot lip 328 at the slot handle gap 330. When compressed in this manner, the triangulated offset hand graspable handles 702, 716 can be pulled away from the coupling housing body 300 for removal or pushed toward the coupling housing body 300 for installation.

The output tube 800 is installed by pushing into the rotational output tube seal 500 such that the seal is slidably surrounding the output tube body 802. In this manner, the output tube aperture 804 is flowable connected at the output tube coupling end 806 through the central aperture 316 to the body through aperture 212 of the weld mount tube 200.

REFERENCE NUMERALS USED THROUGHOUT THE DETAILED DESCRIPTION AND THE DRAWINGS CORRESPOND TO THE FOLLOWING ELEMENTS

Toolless disassembly rotational valve coupling 100
weld mount tube 200
input tube body 210
body through aperture 212 input body interior surface 214
input body exterior surface 216
input flange 220
elbow curve body section 230
output flange 240
weld edge 242
rising weld body 244
input force transfer shoulder 246
input coupling threads 248
flange output end 250
safety chain coupling 260
safety chain 270
chain latch 280
coupling housing body 300
housing input end 310
input body threads 312
input thread friction aperture 314
central aperture 316
output force transfer shoulder 318
output tube 320
output seal aperture 324
output handle retention slot 326
slot lip 328
handle gap 330
housing output end 332
first housing handle mount 340
second housing handle mount 342
angle handle body 344
mounting flange 346
mounting fasteners 348
handle flange 350
handle aperture 352
rotational output tube seal 500
output seal retainer 600
coupling handle ring 700
first triangulated offset hand graspable handle 702
first outer body tab 704
c shaped handle body 706
body interior edge 708
body exterior edge 710
first triangulated offset body retention ear 712
second triangulated offset body retention ear 714
handle offset body retention ear 715
second triangulated offset hand graspable handle 716
second outer body tab 718
rounded handle end 720
handle gap 722
output tube 800
output tube body 802
output tube aperture 804
output tube coupling end 806

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining.' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A toolless disassembly rotational valve coupling apparatus for manipulation by a user's hands and fingers, the coupling apparatus comprising:
   a coupling housing body defining a central aperture, the coupling housing body defining an output seal aperture proximate to an output handle retention slot and slot lip, the slot lip defining a slot handle gap and a slot lip;
   an output seal retainer including a coupling handle ring with a first triangulated offset body retention ear, a second triangulated offset body retention ear, a handle offset body retention ear, a first triangulated offset hand graspable handle, and a second triangulated offset hand graspable handle;
   the first triangulated offset hand graspable handle and second triangulated offset hand graspable handle separated by a ring handle gap;
   wherein the first hand graspable handle and second hand graspable handle can be compressed toward each other to selectively position the first hand graspable handle and second hand graspable handle behind the slot lip;
   a seal body positioned in the output seal aperture; and
   the seal body defining a seal aperture with a seal axis and a tube lip parallel to the seal axis.

2. A toolless disassembly rotational valve coupling apparatus for manipulation by a user's hands and fingers, the coupling apparatus comprising:
   a coupling housing body defining a central aperture, the coupling housing body defining an output seal aperture proximate to an output handle retention slot and slot lip, the slot lip defining a slot handle gap and a slot lip;
   an output seal retainer including a coupling handle ring with a first triangulated offset body retention ear, a second triangulated offset body retention ear, a handle offset body retention ear, a first triangulated offset hand graspable handle, and a second triangulated offset hand graspable handle;
   the first triangulated offset hand graspable handle and second triangulated offset hand graspable handle separated by a ring handle gap;
   wherein the first hand graspable handle and second hand graspable handle can be compressed toward each other to selectively position the first hand graspable handle and second hand graspable handle behind the slot lip;
   a seal body positioned in the output seal aperture; and
   the seal body defining a seal aperture with a seal axis and a body lip perpendicular to the seal axis.

* * * * *